(12) United States Patent
Cookson

(10) Patent No.: US 6,289,767 B1
(45) Date of Patent: Sep. 18, 2001

(54) BAND SAW BLADES

(75) Inventor: Anthony Cookson, Lancashire (GB)

(73) Assignee: Harrison Saw & Tool Limited (GB)

( * ) Notice: Subject to any disclaimer, the term of this patent is extended or adjusted under 35 U.S.C. 154(b) by 0 days.

(21) Appl. No.: 09/508,448

(22) PCT Filed: Jul. 21, 1999

(86) PCT No.: PCT/GB99/02187

§ 371 Date: Mar. 9, 2000

§ 102(e) Date: Mar. 9, 2000

(87) PCT Pub. No.: WO00/05022

PCT Pub. Date: Feb. 3, 2000

(30) Foreign Application Priority Data

Jul. 23, 1998 (GB) .................................................. 9815946

(51) Int. Cl.$^7$ .................................................. B23D 63/00
(52) U.S. Cl. .................................. 76/112; 83/39; 83/76.4; 83/209; 83/371
(58) Field of Search ................................... 76/112; 83/39, 83/76.4, 209–211, 300, 367, 368, 371

(56) References Cited

U.S. PATENT DOCUMENTS

| | | | | |
|---|---|---|---|---|
| 361,536 | * | 4/1887 | Miller | 76/112 |
| 1,503,310 | * | 7/1924 | Ericson | 76/112 |
| 1,718,746 | * | 6/1929 | Lougheed | 76/112 |
| 4,023,448 | * | 5/1977 | Bertini | 76/112 |
| 5,101,551 | * | 4/1992 | Rademacher et al. | 83/371 X |

* cited by examiner

Primary Examiner—Douglas D. Watts
(74) Attorney, Agent, or Firm—Michael Best & Friedrich LLP

(57) ABSTRACT

A method of automatically cutting a variable tooth pitch band saw blade from a bulk reel 40 of blade material 14 is achieved by using a cut to length machine 8. Blade material 14 from the bulk reel 40 is pulled on to a bed 42 of the machine 8. The blade material 14 is placed between rollers 50, which are powered and one of which is a metered roller 44 actuable to dispense a desired amount of the blade material. The cut to length machine 8 includes a cutting section 18 and an optical sensor 24, both connected to and controlled by a computer 46. The cutting section 18 comprises suitable cutting means, such as a mechanical cutter or laser cutter.

15 Claims, 2 Drawing Sheets

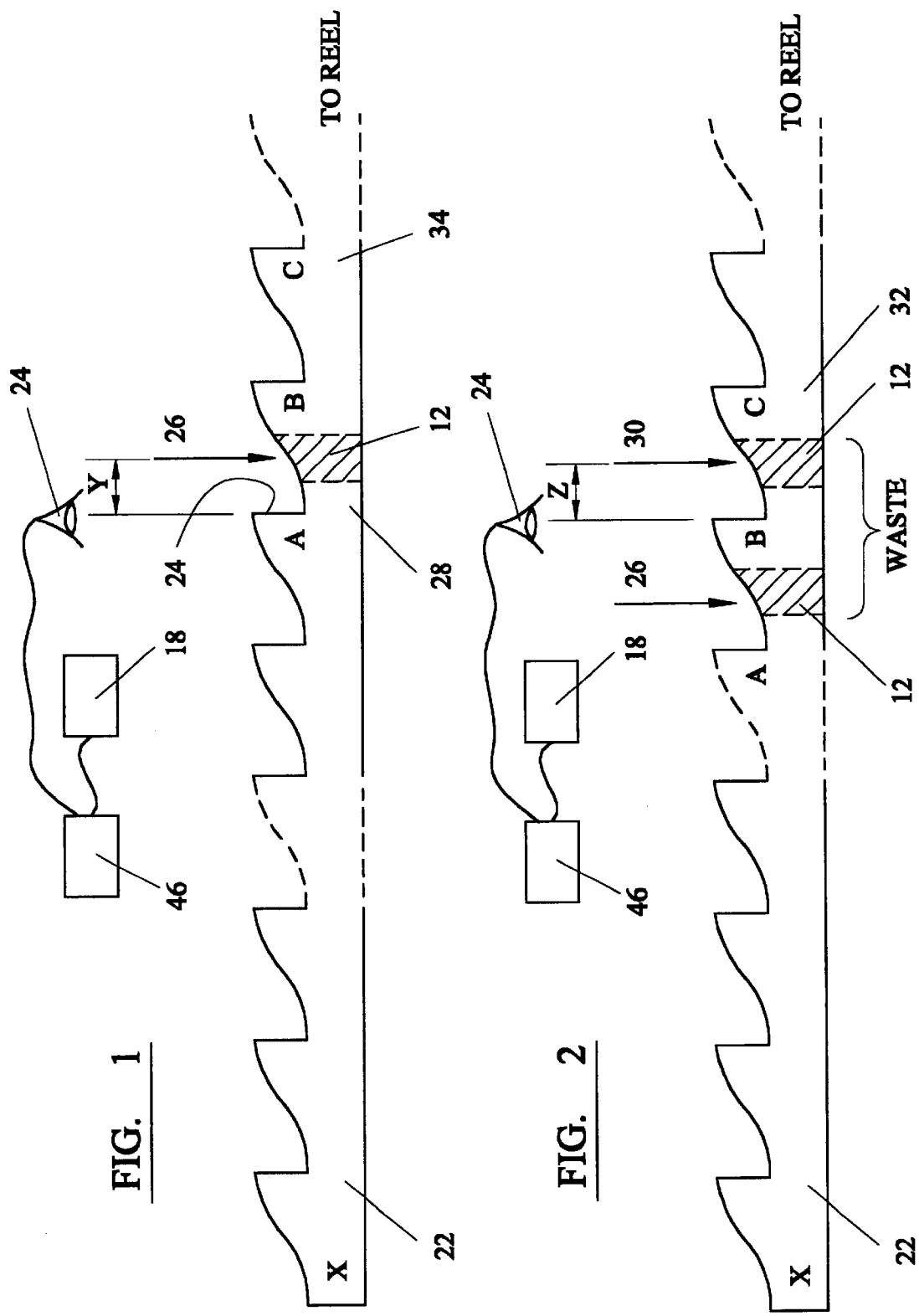

BAND SAW BLADES

This invention relates to a method of cutting a band saw blade to length and to apparatus for cutting a band saw blade to length.

FIG. 3 shows an example of a saw blade which has a variable tooth pitch. The tooth pitch is the distance between the tips of adjacent teeth. In a variable tooth pitch saw blade the vertical distance between the tip of a tooth and the base of the intervening dip (known as the gullet) also varies. When manufacturing a continuous band saw blade having a variable tooth pitch, it is desirable to have matching teeth on the ends of the blade which are welded together to form the band saw blade.

A previous system for cutting a blade to length involves counting the number of teeth using an optical sensor, the number of teeth being used to approximate the length of saw which has passed by the optical sensor. Problems arise with this type of arrangement because with a variable tooth pitch blade the number of teeth detected does not correspond exactly to the total blade length because there is a varying distance between teeth. Consequently, significant disadvantages arise with this system because of its inability to detect a particular length of blade.

Another known system which was developed to address the disadvantages of the system mentioned above, uses an optical sensor to match the pitch of teeth for the ends which are to be welded together. This results in the amount of blade wasted being equal to at least the toothing interval, which is the length of blade over which the pattern of variable tooth pitch repeats. The amount wasted is frequently more than the toothing interval because the photocell used to detect the reference edge is located away from the point of cut. Consequently, because the pitch varies, the system has no means of knowing which part of the blade is in front of the cut point and the electronics must scan the pitches and pick the first pitch match, which could result in a wastage of blade equal to just less than twice the toothing interval.

It is an object of the present invention to address the above mentioned disadvantages.

According to one aspect of the present invention a method of cutting toothed blades from a length of blade material comprises:

a) locating the position of a first end of a first blade section and cutting the blade material at said position;
b) locating the position of a second end of the first blade section relative to a tooth of the blade material using sensing means and storing said position in a memory means;
c) advancing the blade material relative to the sensing means;
d) locating the position of a first end of a second blade section relative to a tooth of the blade material using said sensing means and storing said position in the memory means;
e) advancing said blade material to a cutting means and cutting the second end of the first blade section at the position stored in the memory means in step b) and cutting the first end of the second blade section at the position stored in the memory means in step d); and
f) advancing the blade material to locate, store and then cut first and second ends of subsequent blade sections by repeating steps b) to e).

The method may include steps a) to f) being performed consecutively.

The tooth in step (b) may be adjacent to the tooth in step (d). Alternatively, the tooth in step (b) and the tooth in step (d) may be separated by at least substantially the amount of blade material lost during the cutting operation. The latter case may occur when the tooth pitch of the blade material is substantially equal to or less than the amount of blade material lost during the cutting operation.

Step a) may be undertaken manually or may be undertaken in the same manner as steps b) and d).

The second end in step b) may be located by activating the sensing means after a predetermined length of blade material has passed said sensing means. The blade material may be metered by metering means, which may be metered rollers. The predetermined length may be substantially the desired length of the first blade section.

The position of said second end in either of steps b) and f) may be a predetermined distance from said tooth face, which distance may be determined taking into account the amount of material lost during cutting.

Preferably, the predetermined distance is substantially equal to the sum of the distance from the tooth face to the desired end position and an amount of blade material lost during cutting.

The position of said first end in either of steps d) and f) may be a predetermined distance from said tooth face, which distance may be determined taking into account the amount of material lost during cutting.

Preferably, the predetermined distance is substantially equal to the difference between the distance from the tooth face to the desired end position and an amount of blade material lost during cutting.

Preferably, the first and second end positions coincide with a gullet section of the blade material.

The method may be used with blade material having variable pitch teeth. Preferably, the position of said first and second ends coincide with substantially the same position in the pitch of the blade material.

When used with blade material having variable pitch teeth, an average value of the distance from the tooth face to a desired position in a gullet section of the tooth may be used as a standard value for determining the position of the first and second ends of the blade sections. The method may include subsequent joining of the two ends of the blade sections, preferably by welding.

After joining the joint may be ground to reduce any irregularities therein. The grinding may include grinding any mismatch between adjacent teeth in the join.

According to another aspect of the present invention apparatus for cutting toothed blades from a length of blade material comprises sensing means, memory means, blade advancing means and cutting means, in which, after location of a first end of a first blade section;

the sensing means is actuable to locate the position of a second end of the first blade section relative to a tooth of the blade material and store said position in the memory means;

the blade advancing means is actuable to advance said blade;

the sensing means is actuable to locate the position of a first end of a second blade section relative to a tooth of the blade material and store said position in the memory means; and the blade advancing means is actuable to advance the blade material to the cutting means, which are actuable to cut the blade material at both the position of the second end of the first blade section stored in the memory means and the position of the first end of the second blade section stored in the memory means.

The tooth for the second end of the first blade section may be adjacent to the tooth for the first end of the second blade section. Alternatively those teeth may be separated by at least substantially the amount of blade material lost during operation of the cutting means.

The sensing means may include an edge detector, which may be an optical sensor.

The memory means may be electronic. The memory means may be computing means.

The blade advancing means may be metered, to determine the length of blade material passed therethrough. The blade advancing means may be rollers, which may be powered. The rollers may grip the blade material.

Any of the features disclosed herein may be combined with any aspect of the invention, in any combination.

Specific embodiments of the present invention will now be described by way of example with reference to the accompanying drawings, in which:

FIG. 1 is a diagrammatic side view of a saw blade in a first position in a cut to length machine; and FIG. 2 is a diagrammatic side view of the blade in a second position in the cut to length machine;

Figure 4:
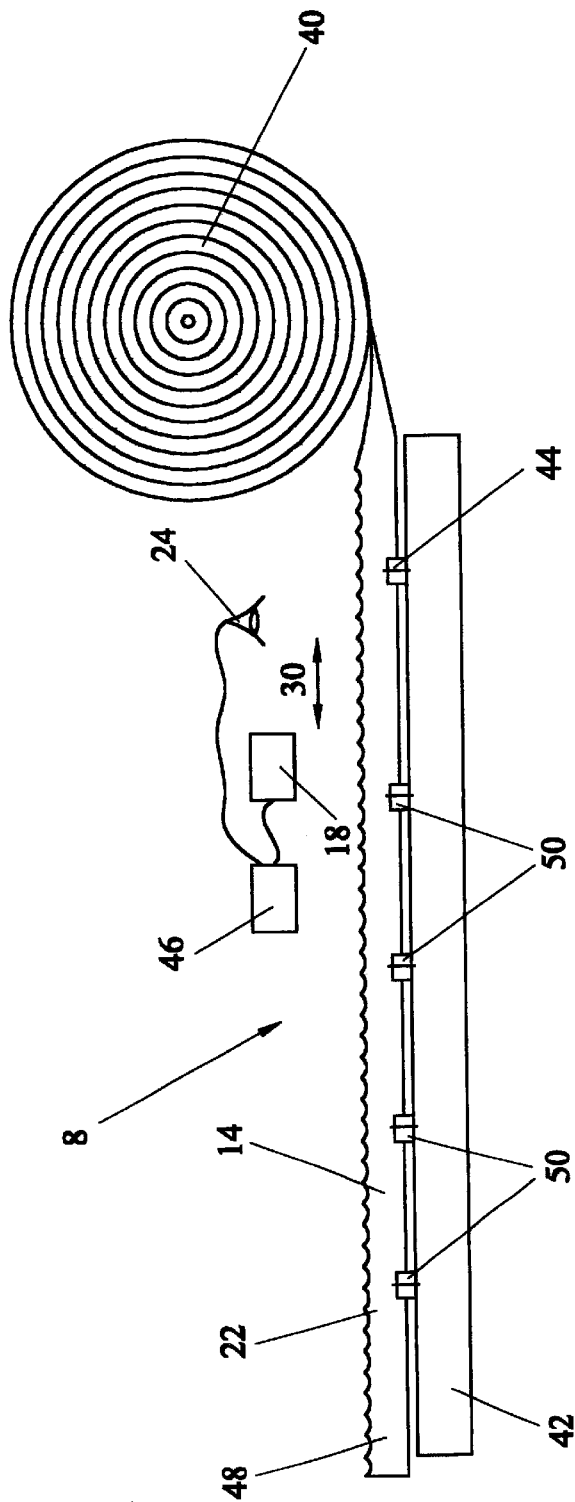
FIG. 4 is a schematic view of the cut to length machine.

A method of automatically cutting a variable tooth pitch band saw blade from a bulk reel 40 of blade material 14 is achieved by the cut to length machine 8 shown schematically in FIG. 4. Blade material 14 from the bulk reel 40 is pulled onto a bed 42 of the machine 8. The blade material 14 is placed between rollers 50, which are powered and one of which is a metered roller 44 actuable to dispense a desired amount of the blade material. The cut to length machine 8 includes a cutting section 18 and an optical sensor 24 both connected to and controlled by a computer 46. The cutting section 18 comprises suitable cutting means, such as a mechanical cutter or laser cutter. The optical sensor 24 may be an electronic edge detector.

Figure 3:
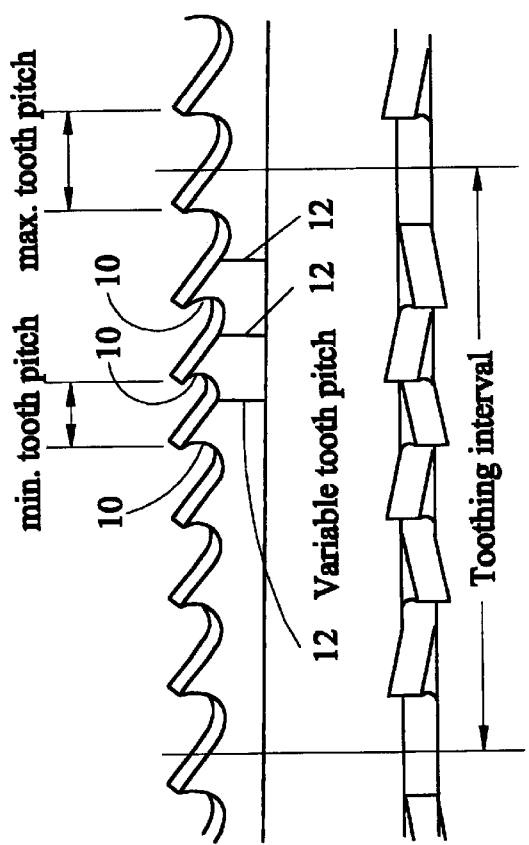
FIG. 3 is a diagrammatic view of a blade having variable pitch teeth.

When cutting a blade portion for welding into a band saw from the blade material 14, it is desirable that the teeth of the two ends to be joined match, at least approximately. Consequently, it is necessary to select a chosen cutting position 12 (see FIG. 3), relative to which all subsequent cuts will be made.

The chosen cutting position 12 is measured relative to a tooth face 10 and the blade has a variable pitch. Consequently, the cutting position 12 will not occur in the same position for each tooth. In order to overcome this potential problem, the computer 46 of the cut to length machine 8 calculates an average distance between the tooth faces 10 and the chosen cut position 12 for each of the different tooth pitches. This average value is then taken as the distance from any tooth face 10 to the chosen cut position 12, for all subsequent cutting operations.

With the blade material 14 in the position shown in FIG. 4, the end 48 of the material is prepared by cutting it at the chosen cut position 12 in the cutting section 18. The end 48 now forms the left hand end of a first blade section 22.

The rollers 44 and 50 are next activated to pull the blade material from the bulk reel 40 through the cut to length machine 8. When a desired length for the first blade section 22 (eg. 2 meters) has been metered by the metered roller 44, the powered rollers 44 and 50 are slowed to allow the optical sensor 24 to detect the first tooth face 10 (the face of tooth A in FIG. 1) to pass the optical sensor 24 after the desired length of blade material 14 has run through the metered roller 44.

On detecting the tooth face 10, the blade is advanced through a distance Y (see FIG. 1), which is equal to the averaged distance to the predetermined cut position 12 plus an amount of burn off (roughly 3 mm) experienced when cutting the blade. This position 26 represents the position at which it is necessary to cut with the cutting means 18 in order for the end of the blade section to coincide with the predetermined cut position 12, when the burn off is taken into account. This position 26 represents the right hand end 28 of the first blade section 22. The position is stored in the computer for a subsequent cutting operation at that position on the blade material 14. It should be noted that material is burnt off from both sides of the cutting means 18, but only one side of this is of interest here since, as will be explained below, the material immediately to the right of the position 26 will be waste material.

The position 12 of a left hand end 32 of a second blade section 34 is determined next, before the cutting is commenced. The blade material 14 is advanced through the cut to length machine 8 until the next tooth face 10 is detected (this being the tooth face 10 of the tooth B in FIG. 2). The blade is then moved forward by a distance Z and that position 30 is stored in the computer memory for subsequent cutting by the cutting section 18. The value Z corresponds to the distance from the tooth face 10 to the average preselected cut position 12 minus an amount for the expected burn off. Here, only the right hand side of the burn off is relevant since the left hand side and the portion shown as "waste" in FIG. 2 is discarded. The position of cutting for the left hand end 32 of, the second blade section 34 has now been stored in the computer 46. Note that the cut positions 26 and 30 are not in the same position relative to a given tooth face because the burn off has a different effect, depending on which end of a blade is being cut.

The blade material 14 is then advanced until the position 26 of cutting to form the right hand end 28 of the first blade section 22 is at the cutting section 18. The blade is then cut at this position and the first blade section 22 is formed. It will be noted that the pitch of the left and right hand ends of the first blade section 22 will correspond quite closely because of the selection of cutting point described above. The first blade section 22 is now ready for the two ends to be welded together to form a band saw blade. Once the two ends have been welded together the weld must be ground to remove any excess material and form a smooth transition between the ends of the blade section 22. Any minor inaccuracy resulting from the different tooth pitches of the joined ends of the first blade section is removed in the above mentioned grinding operation.

The blade material 14 is next advanced so that the position 30 of the left hand end 32 of the second blade section 34 is at the cutting section 18, where the blade material 14 is cut. The cutting operation leaves a wasted piece of material corresponding roughly to the tooth B in FIG. 2 and leaves the left hand end 32 of the second blade section 34 prepared and ready for welding.

The blade material 14 is then advanced through the cut to length machine 8 until the desired length of blade has passed therethrough. The steps mentioned above can then be repeated to identify and store in the computer memory the positions of the right hand end of the second blade section 34 and a left hand end of a third blade section.

The method described above caters for the lengths of blade in which the tooth pitch is relatively large in relation to the amount of burn off formed by the cutting section 18 and also the offset 30 between the optical sensor 24 and the cutting section 18 is relatively large.

Where the tooth pitch of a blade is relatively small, the amount of burn off resulting from cutting the blade may be a significant proportion of, or even exceed, the tooth pitch of that blade. In such a situation the computer can be programmed to move past more than one face, as opposed to moving the distance Y or Z after detecting the first tooth, so that there is sufficient blade passed through the machine to allow for the burn off. The number of tooth faces which are detected does not effect the functioning of the invention, it simply allows more space for the burn off to be taken into account.

An alternative to the manual cutting of the first part of the blade material 14 when entered into the cut to length machine 8, would be to pre-program the machine to detect a tooth face and move the distance Z, log that position in the memory and advance that portion to the cutting means to thereby form the left hand end of the first blade section 22, without the need of manually cutting the edge.

The method and apparatus described above have significant advantages over previous systems and apparatus for cutting band saw blades to length because the wastage of blades is generally kept to approximately one tooth per blade, whereas in the previous systems more than the toothing interval, which could be over 10 cms, would normally be wasted for each blade. Thus, significant cost advantages are encountered with the present system and apparatus because there is considerably less wastage. Also, the fact that a welded band saw blade must be ground whichever method is used is taken advantage of because any slight inaccuracies which are introduced with the method of the present invention can be ground down. Thus, it will be appreciated that the exact matching of the prior art system is unnecessary because of the subsequent grinding step and, in any event, introduces excessive wastage of material.

The use of a memory to store locations for cutting enables greater freedom in locating the optical sensor and the cutting section because if no memory was used the correct tooth face would have to be located and then the cut made, followed by the next locating and cutting step. This would lead to wastage of material of at least the separation between the optical sensor and the cutting section between adjacent cuts. In the present apparatus and method, as long as the separation is known, no extra wastage is caused.

The reader's attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

What is claimed is:

1. A method of cutting toothed blades from a length of blade material comprises:
    a) locating the position of a first end of a first blade section and cutting the blade material at said position;
    b) locating the position of a second end of the first blade section relative to a tooth of the blade material using sensing means and storing said position in a memory means;
    c) advancing the blade material relative to the sensing means;
    d) locating the position of a first end of a second blade section relative to a tooth of the blade material using said sensing means and storing said position in the memory means;
    e) advancing said blade material to a cutting means and cutting the second end of the first blade section at the position stored in the memory means in step b) and cutting the first end of the second blade section at the position stored in the memory means in step d); and
    f) advancing the blade material to locate, store and then cut first and second ends of subsequent blade sections by repeating steps b) to e).

2. A method of cutting toothed blades according to claim 1, in which the tooth in step (b) is adjacent to the tooth in step (d).

3. A method of cutting toothed blades as claimed in claim 1, in which the tooth in step (b) and the tooth in step (d) are separated by at least substantially the amount of blade material lost during the cutting operation.

4. A method of cutting toothed blades as claimed in claim 1, in which the second end in step b) is located by activating the sensing means after a predetermined length of blade material has passed said sensing means.

5. A method of cutting toothed blades as claimed in claim 1, in which the position of said second end in either of steps b) and f) is a predetermined distance from said tooth face.

6. A method of cutting toothed blades as claimed in claim 5, in which the predetermined distance is determined taking into account the amount of material lost during cutting.

7. A method of cutting toothed blades as claimed in claim 5, in which the predetermined distance is substantially equal to the sum of the distance from the tooth face to the desired end position and an amount of blade material lost during cutting.

8. A method of cutting toothed blades as claimed in claim 1, in which the position of said first end in either of steps d) and f) is a predetermined distance from said tooth face, which distance is determined taking into account the amount of material lost during cutting.

9. A method of cutting tooth blades as claimed in claim 8, in which the predetermined distance is substantially equal to the difference between the distance from the tooth face to the desired end position and an amount of blade material lost during cutting.

10. A method of cutting tooth blades as claimed in claim 1, in which the first and second end positions coincide with a gullet section of the blade material.

11. A method of cutting tooth blades as claimed in claim 1, in which the method is used with blade material having variable pitch teeth.

12. A method of cutting tooth blades as claimed in claim 1, in which the positions of said first and second ends coincide with substantially the same position in the pitch of the blade material.

13. A method of cutting tooth blades as claimed in claim 1, which, when used with blade material having variable pitch teeth, an average value of the distance from the tooth face to a desired position in a gullet section of the tooth is used as a standard value for determining the position of the first and second ends of the blade sections.

14. Apparatus for cutting toothed blades from a length of blade material comprises sensing means, memory means, blade advancing means and cutting means, in which, after location of a first end of a first blade section;

the sensing means is actuable to locate the position of a second end of the first blade section relative to a tooth of the blade material and store said position in the memory means;

the blade advancing means is actuable to advance said blade;

the sensing means is actuable to locate the position of a first end of a second blade section relative to a tooth of the blade material and store said position in the memory means; and the blade advancing means is actuable to advance the blade material to the cutting means, which are actuable to cut the blade material at both the position of the second end of the first blade section stored in the memory means and the position of the first end of the second blade section stored in the memory means.

15. Apparatus according to claim 14, in which the sensing means includes an edge detector.

* * * * *